US010360665B2

(12) United States Patent
Gupta et al.

(10) Patent No.: US 10,360,665 B2
(45) Date of Patent: Jul. 23, 2019

(54) SYSTEMS AND METHODS FOR SOLVING INVERSE PROBLEMS USING A COUPLED AUTOENCODER

(71) Applicant: Tata Consultancy Services Limited, Mumbai (IN)

(72) Inventors: Kavya Gupta, Kolkata (IN); Brojeshwar Bhowmick, Kolkata (IN); Angshul Majumdar, Delhi (IN)

(73) Assignee: Tata Consultancy Services Limited, Mumbai (IN)

( * ) Notice: Subject to any disclaimer, the term of this patent is extended or adjusted under 35 U.S.C. 154(b) by 38 days.

(21) Appl. No.: 15/898,144

(22) Filed: Feb. 15, 2018

(65) Prior Publication Data

US 2019/0026869 A1    Jan. 24, 2019

(30) Foreign Application Priority Data

Jul. 24, 2017 (IN) .............................. 201721026251

(51) Int. Cl.
| | |
|---|---|
| *G06T 5/00* | (2006.01) |
| *G06T 9/00* | (2006.01) |
| *G06T 1/20* | (2006.01) |
| *G06N 3/04* | (2006.01) |

(52) U.S. Cl.
CPC .......... *G06T 5/003* (2013.01); *G06N 3/0454* (2013.01); *G06T 1/20* (2013.01); *G06T 5/002* (2013.01); *G06T 9/00* (2013.01); *G06T 2207/20081* (2013.01); *G06T 2207/20084* (2013.01); *G06T 2210/52* (2013.01)

(58) Field of Classification Search
CPC .......... G06T 5/003; G06T 1/20; G06T 5/002; G06T 9/00; G06T 2207/20081; G06T 2207/20084; G06T 2210/52; G06N 3/0454
USPC ....................................................... 382/239
See application file for complete search history.

(56) References Cited

U.S. PATENT DOCUMENTS

| | | | |
|---|---|---|---|
| 2014/0079297 | A1 | 3/2014 | Tadayon et al. |
| 2018/0165554 | A1* | 6/2018 | Zhang ...................... G06N 3/04 |

OTHER PUBLICATIONS

Gupta, Kavya, and Angshul Majumdar. "Regularized autoencoders." (2016). (Year: 2016).*

(Continued)

*Primary Examiner* — Jonathan S Lee
(74) *Attorney, Agent, or Firm* — Finnegan, Henderson, Farabow, Garrett & Dunner LLP

(57) ABSTRACT

Motion blur occur when acquiring images and videos with cameras fitted to the high speed motion devices, for example, drones. Distorted images intervene with the mapping of the visual points, hence the pose estimation and tracking may get corrupted. System and method for solving inverse problems using a coupled autoencoder is disclosed. In an embodiment, solving inverse problems, for example, generating a clean sample from an unknown corrupted sample is disclosed. The coupled autoencoder learns the autoencoder weights and coupling map (between source and target) simultaneously. The technique is applicable to any transfer learning problem. The embodiments of the present disclosure implements/proposes a new formulation that recasts deblurring as a transfer learning problem which is solved using the proposed coupled autoencoder.

15 Claims, 4 Drawing Sheets

(56) References Cited

OTHER PUBLICATIONS

Mehta, Janki, et al. "Stacked robust autoencoder for classification." International Conference on Neural Information Processing. Springer, Cham, 2016. (Year: 2016).*
Wang, Wen, et al. "Deeply coupled auto-encoder networks for cross-view classification." arXiv preprint arXiv:1402.2031(2014). (Year: 2014).*
Zeng, Kun, et al. "Coupled deep autoencoder for single image super-resolution." IEEE transactions on cybernetics 47.1 (2017): 27-37. (Year: 2017).*
Raghavendra, R. et al. "Learning deeply coupled autoencoders for smartphone based robust periocular verification," *2016 IEEE International Conference on Image Processing (ICIP)*, Sep. 25-28, 2016, Phoenix, AZ; pp. 325-329.
Wieschollek, P. et al. (Mar. 2017). "End-to-End Learning for Image Burst Deblurring," *Asian Conference on Computer Vision*, pp. 35-51.

* cited by examiner

SYSTEMS AND METHODS FOR SOLVING INVERSE PROBLEMS USING A COUPLED AUTOENCODER

PRIORITY CLAIM

This U.S. patent application claims priority under 35 U.S.C. § 119 to: India Application No. 201721026251, filed on Jul. 24, 2017. The entire contents of the aforementioned application are incorporated herein by reference.

TECHNICAL FIELD

The disclosure herein generally relate to a coupled autoencoder, and, more particularly, to systems and methods for solving inverse problems using a coupled autoencoder.

BACKGROUND

An inverse problem in science is the process of calculating from a set of observations the causal factors that produced them: for example, calculating an image in computer tomography, etc. Inverse problems are some of the most important mathematical problems in science and mathematics because they tell about parameters that cannot be directly observed. They have wide application in signal processing, machine learning, image processing, etc. Motion blurring is one of the common source of image corruption in image processing techniques. It can be caused due to multiple reasons such as lens aberrations, camera shaking, long exposure time etc. The process of recovering sharp images from blurred images is termed as deblurring. Conventional deblurring techniques implement non-generalized kernel based approaches. However these approaches may not be efficient and are computational complex.

SUMMARY

Embodiments of the present disclosure present technological improvements as solutions to one or more of the above-mentioned technical problems recognized by the inventors in conventional systems. For example, in one aspect, a system for solving inverse problems is provided. The system comprising: a memory storing instructions; one or more communication interfaces; and one or more hardware processors coupled to the memory via the one or more communication interfaces, wherein the one or more hardware processors are configured by the instructions to execute: a coupled autoencoder stored in the memory, the coupled autoencoder comprising: a source autoencoder including a source encoder represented by a variable $W_{ES}$ and a source decoder represented by a variable $W_{DS}$, wherein the source autoencoder is configured to receive one or more corrupted samples represented by a variable $X_S$, and wherein a first set of hidden layer representations of the source autoencoder is represented as a first proxy ($Z_S$) for the one or more corrupted image samples ($X_S$); a target autoencoder coupled to the source autoencoder, wherein the target autoencoder comprises a target encoder represented by a variable $W_{ET}$ and a target decoder represented by a variable $W_{DT}$, wherein the target autoencoder is configured to receive one or more corresponding clean image samples represented by a variable $X_T$, wherein a second set of hidden layer representations of the target autoencoder is represented as a second proxy represented by a variable $Z_T$ for the corresponding clean image samples represented by a variable $X_T$, wherein the $Z_S$ and $Z_T$ are coupled, using a coupling mechanism (M), which form a Lagrangian formulation, and wherein a plurality of Bregman relaxation variables ($B_S$) and ($B_T$) are initialized for the source autoencoder and the target autoencoder respectively; wherein the coupled autoencoder is configured to: divide the Lagrangian formulation into one or more sub-problems, solve the one or more sub-problems by learning each of the source decoder ($W_{DS}$), the target decoder ($W_{DT}$), the first proxy ($Z_S$), the second proxy ($Z_T$), the coupling mechanism (M), the plurality of Bregman relaxation variables $B_S$ and $B_T$, the source encoder ($W_{ES}$), the target encoder ($W_{ET}$) pertaining to the source autoencoder and the target autoencoder respectively; and iteratively update the plurality of Bregman relaxation variables ($B_S$) and ($B_T$) using an optimization technique. In an embodiment, the Lagrangian formulation is solved using a Split Bregman technique. In an embodiment, the optimization technique is a gradient descent optimization technique. In an embodiment, the step of learning each of the source decoder ($W_{DS}$), the target decoder ($W_{DT}$), the first proxy ($Z_S$), the second proxy ($Z_T$), the coupling mechanism (M), the plurality of Bregman relaxation variables $B_S$ and $B_T$, the source encoder ($W_{ES}$), the target encoder ($W_{ET}$) pertaining to the source autoencoder and the target autoencoder respectively comprising learning one or more values associated with each of the source decoder ($W_{DS}$), the target decoder ($W_{DT}$), the first proxy ($Z_S$), the second proxy ($Z_T$), the coupling mechanism (M), the plurality of Bregman relaxation variables $B_S$ and $B_T$, the source encoder ($W_{ES}$), the target encoder ($W_{ET}$) pertaining to the source autoencoder and the target autoencoder respectively.

In an embodiment, the coupled autoencoder is further configured to receive an unknown corrupted sample, and wherein a source decoder ($W_{DS}$) is configured to: receive the unknown corrupted sample from the coupled autoencoder; obtain one or more hidden layer representations of the unknown corrupted sample and transmit to the coupling mechanism (M), wherein the coupling mechanism further transmits the obtained one or more hidden layer representations of the unknown corrupted sample to the target encoder ($W_{ET}$).

In an embodiment, the coupled autoencoder is further configured to: couple the obtained hidden layer representations with each other to obtain one or more hidden layer representations pertaining to the target autoencoder; and transmit the hidden layer representations pertaining to the target autoencoder to the target encoder for generation of a clean sample from the unknown corrupted sample.

In another aspect, a processor implemented method for solving inverse problems using a coupled autoencoder, the method comprising: receiving, by a source autoencoder, one or more corrupted samples represented by a variable $X_S$, wherein a first set of hidden layer representations of the source autoencoder is represented as a first proxy ($Z_S$) for the one or more corrupted image samples ($X_S$), and wherein the source autoencoder including a source encoder represented by a variable $W_{ES}$ and a source decoder represented by a variable $W_{DS}$; receiving, by a target autoencoder coupled to the source autoencoder, one or more corresponding clean image samples represented by a variable $X_T$, wherein a second set of hidden layer representations of the target autoencoder is represented as a second proxy represented by a variable $Z_T$ for the corresponding clean image samples represented by a variable $X_T$, wherein the target autoencoder comprises a target encoder represented by a variable $W_{ET}$ and a target decoder represented by a variable $W_{DT}$, wherein the $Z_S$ and $Z_T$ are coupled, using a coupling mechanism (M), which form a Lagrangian formulation, and wherein a plurality of Bregman relaxation variables ($B_S$) and ($B_T$) are initialized for the source autoencoder and the target autoencoder respectively; dividing, by the coupled autoencoder, the Lagrangian formulation into one or more sub-problems; solving, by the coupled autoencoder, the one or more sub-problems by learning each of the source decoder ($W_{DS}$), the target decoder ($W_{DT}$), the first proxy ($Z_S$), the second proxy ($Z_T$), the coupling mechanism (M), the plurality of Bregman relaxation variables $B_S$ and $B_T$, the source encoder ($W_{ES}$), the target encoder ($W_{ET}$) pertaining to the source autoencoder and the target autoencoder respectively; and iteratively updating, by the coupled autoencoder, the plurality of Bregman relaxation variables ($B_S$) and ($B_T$) using an optimization technique. In an embodiment, the optimization technique is a gradient descent optimization technique. In an embodiment, the step of learning each of the source decoder ($W_{DS}$), the target decoder ($W_{DT}$), the first proxy ($Z_S$), the second proxy ($Z_T$), the coupling mechanism (M), the plurality of Bregman relaxation variables $B_S$ and $B_T$, the source encoder ($W_{ES}$), the target encoder ($W_{ET}$) pertaining to the source autoencoder and the target autoencoder respectively comprising learning one or more values associated with each of the source decoder ($W_{DS}$), the target decoder ($W_{DT}$), the first proxy ($Z_S$), the second proxy ($Z_T$), the coupling mechanism (M), the plurality of Bregman relaxation variables $B_S$ and $B_T$, the source encoder ($W_{ES}$), the target encoder ($W_{ET}$) pertaining to the source autoencoder and the target autoencoder respectively.

In an embodiment, the method may further comprise receiving, by a source decoder ($W_{DS}$), an unknown corrupted sample; obtaining one or more hidden layer representations of the unknown corrupted sample and transmit to the coupling mechanism (M), wherein the coupling mechanism further transmits the obtained one or more hidden layer representations of the unknown corrupted sample and then to the target encoder ($W_{ET}$). In an embodiment, the method may further comprise coupling the obtained hidden layer representations to obtain one or more hidden layer representations pertaining to the target autoencoder; and transmitting the hidden layer representations pertaining to the target autoencoder to the target encoder for generation of a clean sample from the unknown corrupted sample.

In an embodiment, the Lagrangian formulation is solved using a Split Bregman technique.

In yet another aspect, one or more non-transitory machine readable information storage mediums comprising one or more instructions is provided. The one or more instructions which when executed by one or more hardware processors causes solving inverse problems using a coupled autoencoder. The instructions comprising: receiving, by a source autoencoder, one or more corrupted samples represented by a variable $X_S$, wherein a first set of hidden layer representations of the source autoencoder is represented as a first proxy ($Z_S$) for the one or more corrupted image samples ($X_S$), and wherein the source autoencoder including a source encoder represented by a variable $W_{ES}$ and a source decoder represented by a variable $W_{DS}$; receiving, by a target autoencoder coupled to the source autoencoder, one or more corresponding clean image samples represented by a variable $X_T$, wherein a second set of hidden layer representations of the target autoencoder is represented as a second proxy represented by a variable $Z_T$ for the corresponding clean image samples represented by a variable $X_T$, wherein the target autoencoder comprises a target encoder represented by a variable $W_{ET}$ and a target decoder represented by a variable $W_{DT}$, wherein the $Z_S$ and $Z_T$ are coupled, using a coupling mechanism (M), which form a Lagrangian formulation, and wherein a plurality of Bregman relaxation variables ($B_S$) and ($B_T$) are initialized for the source autoencoder and the target autoencoder respectively; dividing, by the coupled autoencoder, the Lagrangian formulation into one or more sub-problems; solving, by the coupled autoencoder, the one or more sub-problems by learning each of the source decoder ($W_{DS}$), the target decoder ($W_{DT}$), the first proxy ($Z_S$), the second proxy ($Z_T$), the coupling mechanism (M), the plurality of Bregman relaxation variables $B_S$ and $B_T$, the source encoder ($W_{ES}$), the target encoder ($W_{ET}$) pertaining to the source autoencoder and the target autoencoder respectively; and iteratively updating, by the coupled autoencoder, the plurality of Bregman relaxation variables ($B_S$) and ($B_T$) using an optimization technique. In an embodiment, the optimization technique is a gradient descent optimization technique.

In an embodiment, the instructions which when executed by the hardware processors (or the coupled autoencoder) may further comprise receiving, by a source decoder ($W_{DS}$), an unknown corrupted sample; obtaining one or more hidden layer representations of the unknown corrupted sample and transmit to the coupling mechanism (M), wherein the coupling mechanism further transmits the obtained one or more hidden layer representations of the unknown corrupted sample to the target encoder ($W_{ET}$). In an embodiment, the method may further comprise coupling the obtained hidden layer representations to obtain one or more hidden layer representations pertaining to the target autoencoder; and transmitting the hidden layer representations pertaining to the target autoencoder to the target encoder for generation of a clean sample from the unknown corrupted sample.

In an embodiment, the Lagrangian formulation is solved using a Split Bregman technique. In an embodiment, the step of learning each of the source decoder ($W_{DS}$), the target decoder ($W_{DT}$), the first proxy ($Z_S$), the second proxy ($Z_T$), the coupling mechanism (M), the plurality of Bregman relaxation variables $B_S$ and $B_T$, the source encoder ($W_{ES}$), the target encoder ($W_{ET}$) pertaining to the source autoencoder and the target autoencoder respectively comprising learning one or more values associated with each of the source decoder ($W_{DS}$), the target decoder ($W_{DT}$), the first proxy ($Z_S$), the second proxy ($Z_T$), the coupling mechanism (M), the plurality of Bregman relaxation variables $B_S$ and $B_T$, the source encoder ($W_{ES}$), the target encoder ($W_{ET}$) pertaining to the source autoencoder and the target autoencoder respectively.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
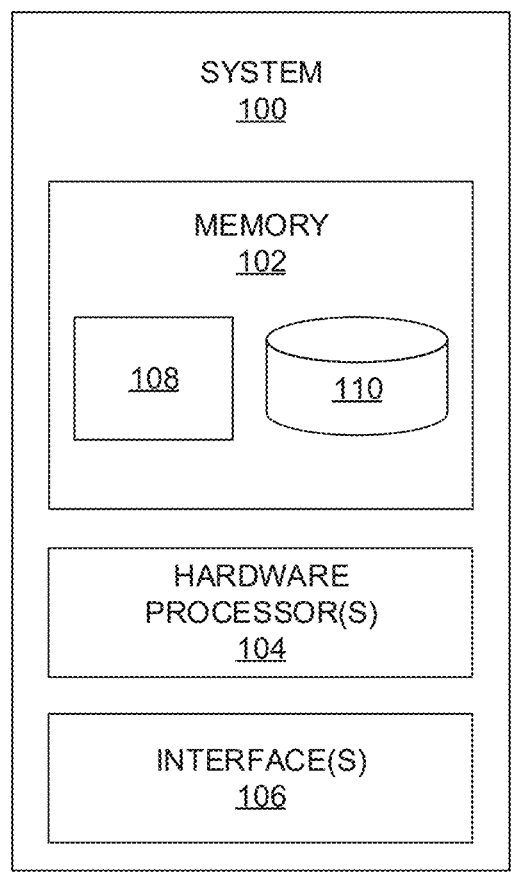
FIG. 1 illustrates an exemplary block diagram of a system for solving inverse problems using a coupled autoencoder in accordance with an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

There are plethora of studies which use neural networks and Convolutional neural networks (CNNs) frameworks for solving computer vision tasks. The motivation for having fast deblurring techniques comes from the requirement of sharp and undistorted images for the purpose of SLAM (Simultaneous Localization and Mapping), visual odometers, optical flow, etc. There is a constant problem of motion blur while acquiring images and videos with the cameras fitted to the high speed motion devices, for example, drones. Distorted images intervene with the mapping of the visual points, hence the pose estimation and tracking may get corrupted.

Embodiments of the present disclosure propose systems and methods for solving inverse problems using a coupled autoencoder. In an example embodiment, the embodiments of the present disclosure propose a joint optimization technique for coupled autoencoder which learns the autoencoder weights and coupling map (between source and target) simultaneously. The technique is applicable to any transfer learning problem. The embodiments of the present disclosure implements/proposes a new formulation that recasts deblurring as a transfer learning problem which is solved using the proposed coupled autoencoder. The embodiments of the present disclosure may be implemented in one or more fields, for example, optics, radar, acoustics, signal processing, medical imaging, computer vision, machine learning, and so on wherein input is unknown corrupted sample(s) to generate one or more clean samples thereof as output(s).

Referring now to the drawings, and more particularly to FIGS. 1 through 4, where similar reference characters denote corresponding features consistently throughout the figures, there are shown preferred embodiments and these embodiments are described in the context of the following exemplary system and/or method.

FIG. 1 illustrates an exemplary block diagram of a system 100 for solving inverse problems using a coupled autoencoder 108 in accordance with an embodiment of the present disclosure. In an embodiment, the system 100 includes one or more processors 104, communication interface device(s) or input/output (I/O) interface(s) 106, and one or more data storage devices or memory 102 operatively coupled to the one or more processors 104. The one or more processors 104 may be one or more software processing modules and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the device 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the coupled autoencoder 108 and a database 110 of the system 100 can be stored in the memory 102, wherein the database 110 may comprise, but are not limited to unknown corrupted samples, clean samples, training dataset, naturally-blurred and artificially-blurred images in the training dataset and undistorted, naturally blurred and artificially blurred images, learned variables and corresponding values, etc.

Figure 2:
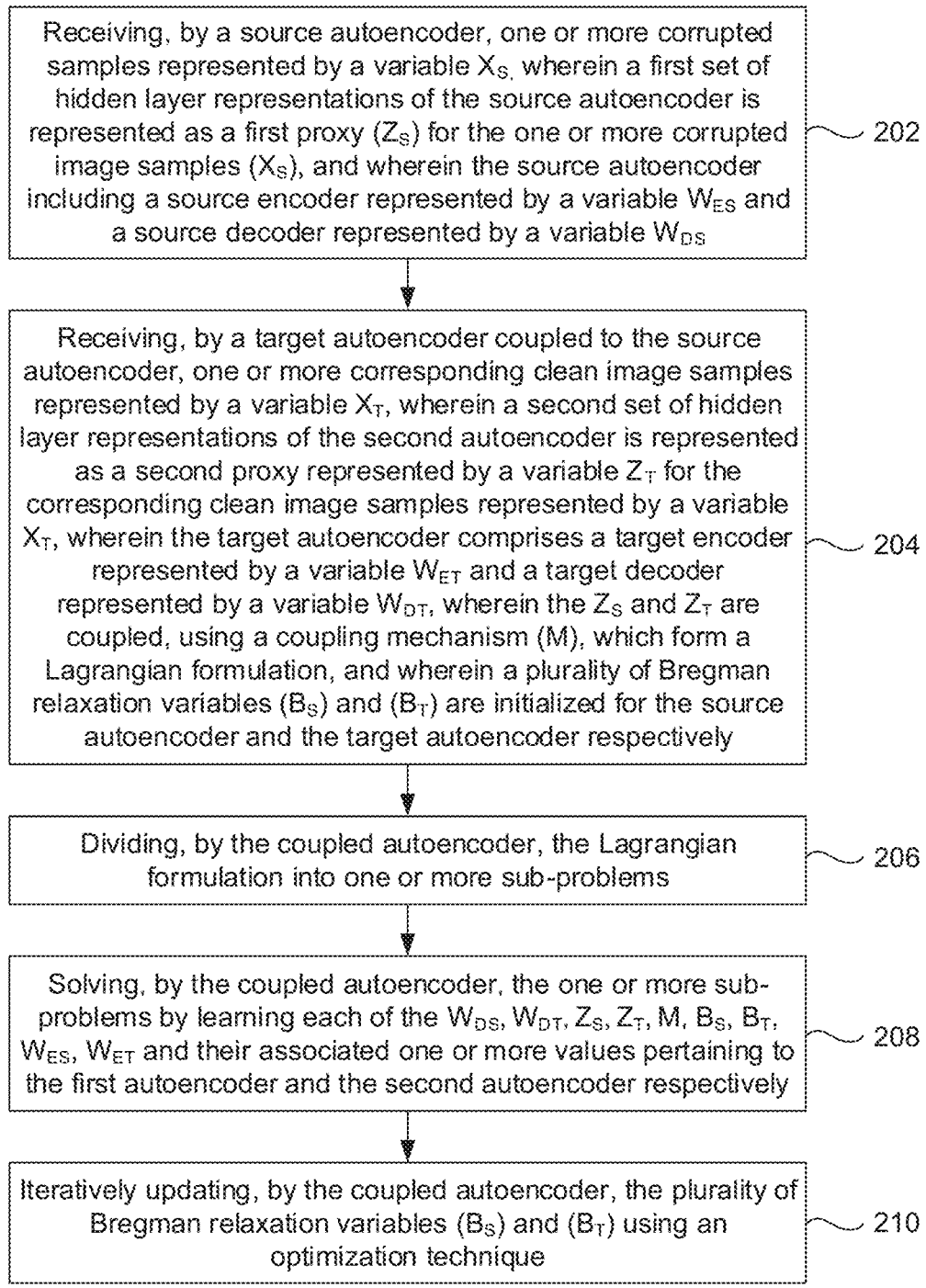
FIG. 2 illustrates an exemplary flow diagram of a method for solving inverse problems using the coupled autoencoder of the system of FIG. 1 in accordance with an embodiment of the present disclosure.

FIG. 2, with reference to FIG. 1, illustrates an exemplary flow diagram of a method for solving inverse problems using the coupled autoencoder 108 of the system 100 of FIG. 1 in accordance with an embodiment of the present disclosure. In an embodiment, the system(s) 100 comprises one or more data storage devices or the memory 102 operatively coupled to the one or more hardware processors 104 and is configured to store instructions for execution of steps of the method by the one or more processors 104. The steps of the method of the present disclosure will now be explained with reference to the components of the system 100 as depicted in FIG. 1, and the flow diagram. In an embodiment, solving inverse problems may comprise, but are not limited to, generating clean images from blurred images, de-noising of noisy or distorted samples (or images), and so on. In an embodiment of the present disclosure, at step 202, the one or more hardware processors 104 receives (202), via a source autoencoder, one or more corrupted samples (represented by a variable $X_S$), wherein a first set of hidden layer representations of the source autoencoder is represented as a first proxy ($Z_S$) for the one or more corrupted image samples ($X_S$). In an embodiment the source autoencoder is configured to receive one or more corrupted samples from the database 110 (or manually fed by one or more users). In an embodiment, the source autoencoder comprises a source encoder represented by a variable $W_{ES}$ and a source decoder represented by a variable $W_{DS}$. In an embodiment of the present disclosure, at step 204, a target autoencoder coupled to the source autoencoder wherein the target autoencoder is configured to receive, one or more corresponding clean image samples (represented by a variable $X_T$). In an embodiment, a second set of hidden layer representations of the target autoencoder is represented as a second proxy represented by a variable $Z_T$ for the corresponding clean image samples represented by a variable $X_T$. The target autoencoder comprises a target encoder represented by a variable $W_{ET}$ and a target decoder represented by a variable $W_{DT}$. In an embodiment, the target autoencoder is configured to receive one or more corresponding clean samples from the database 110 (or manually fed by one or more users). The first proxy $Z_S$ and the second proxy $Z_T$ are coupled, using a coupling mechanism (M), which form a Lagrangian formulation, and wherein a plurality of Bregman relaxation variables ($B_S$) and ($B_T$) are initialized for the source autoencoder and the target autoencoder respectively. The coupling mechanism M learns to map the representation from the source (corrupted) to the target (clean), which is expressed by way of example as illustrated below:

$$\operatorname{argmin}_{W_{DS}, W_{ES}, W_{DT}, W_{ET}, M} \|X_S - W_{DS\varphi}(W_{ES}X_S)\|^2_F + \|X_T - W_{DT\varphi}(W_{ET}X_T)\|^2_F + \lambda\|\varphi(W_{ET}X_T) - M\varphi(W_{ES}X_S)\|^2_F \quad (1)$$

Where $\lambda X_S - W_{DS\varphi}(W_{ES}X_S)\|^2 F$ is autoencoder formulation for source, and $\|X_T - W_{DT\varphi}(W_{ET}X_T)\|^2 F$ is autoencoder formulation for target, and $\lambda\|\varphi(W_{ET}X_T) - M\varphi(W_{ES}X_S)\|^2 F$ is coupling term. The linear map M (or coupling mechanism) couples the representations (e.g., the one or more hidden layer representations) from the source to that of the target. The above expression is solved using a variable splitting technique. One or more proxies, for example, $Z_S = \varphi(W_{ES}X_S)$ and $Z_T = \varphi(W_{ET}X_T)$ are introduced thus forming a Lagrangian. As discussed above one or more Bregman relaxation variables are introduced $B_S$ and $B_T$ such that the value of the hyper-parameter need not be changed; the relaxation variable is updated in every iteration automatically so that it enforces equality at convergence. The split Bregman formulation is expressed as below by way of example:

$$\operatorname{argmin}_{W_{DS}, W_{ES}, W_{DT}, W_{ET}, M, Z_S, Z_T} \|X_S - W_{DS}Z_S\|^2_F + \|X_T - W_{DT}Z_T\|^2_F + \lambda\|Z_T - MZ_S\|^2_F + n\|Z_S - \varphi(W_{ES}X_S) - B_S\|^2_F \quad (2)$$

In an embodiment of the present disclosure, at step 206, the coupled autoencoder 108 divides the above Lagrangian formulation as expressed in equation (2) into one or more sub-problems as expressed by way of examples below:

$$P1 = \operatorname{argmin}_{W_{DS}} \|X_S - W_{DS}Z_S\|^2_F$$

$$P2 = \operatorname{argmin}_{W_{DT}} \|X_T - W_{DT}Z_T\|^2_F$$

$$P3 = \operatorname{argmin}_{W_{ES}} \|Z_S - \varphi(W_{ES}X_S) - B_S\|^2_F$$

$$\equiv \operatorname{argmin}_{W_{ES}} \|\varphi^{-1}(Z_S - B_S) - W_{ES}X_S\|^2_F$$

$$P4 = \operatorname{argmin}_{W_{ET}} \|Z_T - \varphi(W_{ET}X_T) - B_T\|^2_F$$

$$\equiv \operatorname{argmin}_{W_{ET}} \|\varphi^{-1}(Z_T - B_T) - W_{ET}X_T\|^2_F$$

$$P5 = \operatorname{argmin}_{Z_S} \|X_S - W_{DS}Z_S\|^2_F + \lambda\|Z_T - MZ_S\|^2_F + n\|Z_S - \varphi(W_{ES}X_S) - B_S\|^2_F$$

$$P6 = \operatorname{argmin}_{Z_T} \|X_T - W_{DT}Z_T\|^2_F + \lambda\|Z_T - MZ_S\|^2_F + n\|Z_T - \varphi(W_{ET}X_T) - B_T\|^2_F$$

$$P7 = \operatorname{argmin}_M \|Z_T - MZ_S\|^2_F$$

In an embodiment of the present disclosure, at step 208, the above one or more sub-problems (P1 till P7) are solved by learning each of the source decoder ($W_{DS}$), the target decoder ($W_{DT}$), the first proxy ($Z_S$), the second proxy ($Z_T$), the coupling mechanism (M), the plurality of Bregman relaxation variables $B_S$ and $B_T$, the source encoder ($W_{ES}$), the target encoder ($W_{ET}$) pertaining to the source autoencoder and the target autoencoder respectively. In an embodiment, the step of learning each of the source decoder ($W_{DS}$), the target decoder ($W_{DT}$), the first proxy ($Z_S$), the second proxy ($Z_T$), the coupling mechanism (M), the plurality of Bregman relaxation variables $B_S$ and $B_T$, the source encoder ($W_{ES}$), the target encoder ($W_{ET}$) pertaining to the source autoencoder and the target autoencoder respectively may comprise learning one or more values associated with each of the source decoder ($W_{DS}$), the target decoder ($W_{DT}$), the first proxy ($Z_S$), the second proxy ($Z_T$), the coupling mechanism (M), the plurality of Bregman relaxation variables $B_S$ and $B_T$, the source encoder ($W_{ES}$), the target encoder ($W_{ET}$) pertaining to the source autoencoder and the target autoencoder respectively. In an embodiment, sub-problems P1, P2, P5, P6, P7 are simple least squares problems having an analytic solution in the form of pseudoinverse. Sub-problems P3 and P4 are originally non-linear least squares problems; but since the activation function is trivial to invert (it is applied element-wise), P3 and P4 are converted to simple linear least squares problems and solved using pseudo-inverse. In an embodiment of the present disclosure, at step 210, the coupled autoencoder 108 iteratively updates the plurality of Bregman relaxation variables ($B_S$) and ($B_T$) using an optimization technique. In an embodiment, the optimization technique is a gradient descent optimization technique. In an embodiment, the plurality of Bregman relaxation variables ($B_S$) and ($B_T$) are iteratively updated by using the following expressions illustrated by way of examples:

$$B_S \leftarrow \varphi(W_{ES}X_S) + B_S - Z_S \quad (3)$$

$$B_T \leftarrow \varphi(W_{ET}X_T) + B_T - Z_T \quad (4)$$

Iterations criteria is defined to be terminated when it reaches a specified maximum number of iterations or when the objective function converges to a local minimum. By convergence it is meant that the value of the objective function does not change much in successive iterations.

Upon learning each of the above variables mentioned, the coupled autoencoder 108 is configured to receive an unknown corrupted sample, wherein the source decoder ($W_{DS}$) is configured to: receive the unknown corrupted sample from the coupled autoencoder 108, and one or more hidden layer representations of the unknown corrupted sample are obtained and transmitted to the coupling mechanism (M) which further transmits to the target encoder ($W_{ET}$).

The coupled autoencoder 108 is further configured to: couple (e.g., using the coupling mechanism M), the obtained hidden layer representations with each other to obtain one or more hidden layer representations pertaining to the target autoencoder, and transmits the hidden layer representations pertaining to the target autoencoder to the target encoder for generation of a clean sample from the unknown corrupted sample. The target encoder then generates a clean sample (e.g., a clean image) from the unknown corrupted sample (e.g., a corrupted image or a blur image or a noisy image or a distorted image).

Figure 3:
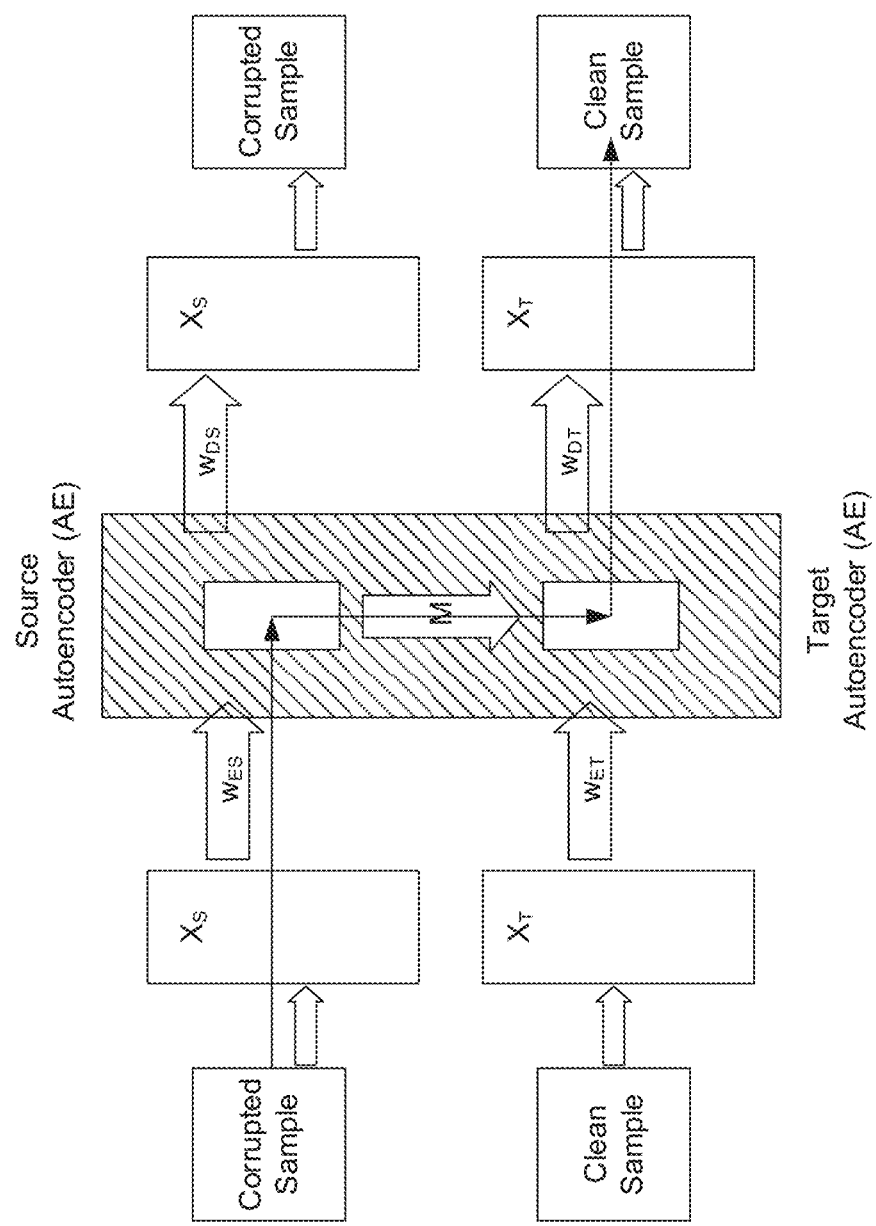
FIG. 3 illustrates an exemplary schematic diagram of the coupled autoencoder of the system of FIG. 1 according to an embodiment of the present disclosure.

Experimental Results:

Images from image blur dataset were used which contained 630 undistorted, 220 naturally-blurred and 150 artificially-blurred images in the training set and 619 undistorted, 411 naturally blurred and 450 artificially blurred images in the evaluation set. For performance evaluation a small subset of the dataset was considered. Around 50 images were taken for training, 20 images for testing and were corrupted with the motion blur kernels. The methodology was tested for two scenarios uniform kernel and non-uniform kernel. For training and testing, whole image was divided into number of overlapping patches. Each individual patch acts as a sample. The blurry patches are used to train the source autoencoder, the corresponding clean patches to train the target autoencoder and a mapping is learnt between the target and source representation. The above training and mapping is carried out without having to preprocess the images or patches. During testing, the blurred patch was given as the input of the source. The corresponding source representation was obtained from the source encoder from which the target representation is obtained by the coupling map. Once the target representation is obtained, the decoder of the target was used to generate the clean (deblurred) patch. Once all the individual patches of the testing image are deblurred, the whole image was reconstructed by placing patches at their locations and averaging at the overlapping regions. This eliminates the need of blocking artefacts and post processing of the recovered images. Patches of 40×40 with an overlapping of 20×20 were used for all the images. The input size for the autoencoders hence become 1600 and were learnt with 1400 hidden nodes. There are just two parameters $\lambda$ and n while training which do not require much tuning. Whereas the testing is parameter free. The testing flow is depicted in FIG. 3. More particularly, FIG. 3 illustrates an exemplary schematic diagram of the coupled autoencoder 108 of the system 100 according to an embodiment of the present disclosure.

The proposed method of the present disclosure is also compared with existing techniques (ET) which estimates the kernel and retrieve deblurred image by deconvolution and which learns a Vectorized CNN for deblurring. The consolidated results are shown in below Table 1. The PSNR (Peak signal-to-noise ratio) and SSIM (structural similarity) values are averaged over for all the 20 testing images.

| Blur Type | | ET1 | ET2 | ET3 | ET4 | ET5 | ET6 | Proposed technique |
|---|---|---|---|---|---|---|---|---|
| Uniform Blur | (PSNR) | 23.7679 | 23.5257 | 23.6927 | 22.9265 | 25.6540 | 20.9342 | 30.8893 |
| | (SSIM) | 0.6929 | 0.6899 | 0.7015 | 0.6620 | 0.7708 | 0.7312 | 0.8787 |
| Non-uniform Blur | (PSNR) | 20.3013 | 20.4161 | 19.6594 | 20.5548 | 19.9718 | 20.8228 | 29.6364 |
| | (SSIM) | 0.5402 | 0.5361 | 0.5345 | 0.5812 | 0.5692 | 0.7328 | 0.8711 |

As can be depicted from above Table 1, that the proposed methodology provides or yields better results on both PSNR and SSIM for both uniform and non-uniform blur. The experimentation showed that the framework can learn characteristics for different kinds of motion blur and yields good performances on them as well.

Figure 4:
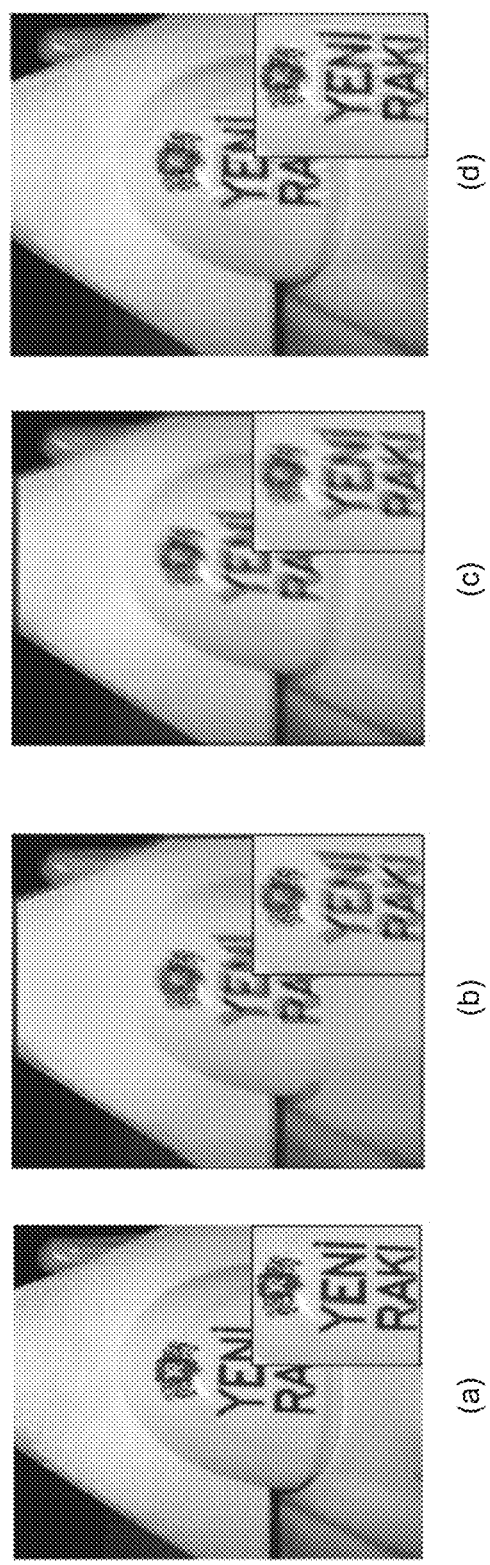
FIG. 4 depict Non-uniform Blur Removal Comparison of the proposed methodology and existing techniques in accordance with an example embodiment of the present disclosure.

FIG. 4, with reference to FIGS. 1 through 3, depict Non-uniform Blur Removal Comparison of the proposed methodology and existing techniques in accordance with an example embodiment of the present disclosure. More particularly, image (a) of FIG. 4 depicts Ground truth, image (b) of FIG. 4 depicts output generated by ET 3 (from Table 1), image (c) of FIG. 4 depicts output generated by ET 4 (from Table 1), and image (d) of FIG. 4 depicts output generated by the coupled autoencoder 108 of the system 100 of the present disclosure. PSNR, SSIM of ET 3 are 21.43 0.73 respectively, whereas PSNR, SSIM of ET 4 are 21.91 and 0.76 respectively, and PSNR, SSIM of the coupled autoencoder 108 of the system 100 of the present disclosure are 30.37 and 0.89 respectively.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A system (100) for solving inverse problems comprising:
a memory (102) storing instructions;
one or more communication interfaces (106); and
one or more hardware processors (104) coupled to the memory (102) via the one or more communication interfaces (106), wherein the one or more hardware processors (104) are configured by the instructions to execute:
a coupled autoencoder stored in the memory, the coupled autoencoder comprising:
a source autoencoder including a source encoder represented by a variable $W_{ES}$ and a source decoder represented by a variable $W_{DS}$, wherein the source autoencoder is configured to receive one or more corrupted samples represented by a variable $X_S$, and wherein a first set of hidden layer representations of the source autoencoder is represented as a first proxy $(Z_S)$ for the one or more corrupted image samples $(X_S)$;
a target autoencoder coupled to the source autoencoder, wherein the target autoencoder comprises a target encoder represented by a variable $W_{ET}$ and a target decoder represented by a variable $W_{DT}$, wherein the target autoencoder is configured to receive one or more corresponding clean image samples represented by a variable $X_T$, wherein a second set of hidden layer representations of the target autoencoder is represented as a second proxy represented by a variable $Z_T$ for the corresponding clean image samples represented by a variable $X_T$, wherein the $Z_S$ and $Z_T$ are coupled, using a coupling mechanism (M), which form a Lagrangian formulation, and wherein a plurality of Bregman relaxation variables $(B_S)$ and $(B_T)$ are initialized for the source autoencoder and the target autoencoder respectively;
wherein the coupled autoencoder is configured to:
divide the Lagrangian formulation into one or more sub-problems,
solve the one or more sub-problems by learning each of the source decoder $(W_{DS})$, the target decoder $(W_{DT})$, the first proxy $(Z_S)$, the second proxy $(Z_T)$, the coupling mechanism (M), the plurality of Bregman relaxation variables $B_S$ and $B_T$, the source encoder $(W_{ES})$, the target encoder $(W_{ET})$ pertaining to the source autoencoder and the target autoencoder respectively; and
iteratively update the plurality of Bregman relaxation variables $(B_S)$ and $(B_T)$ using an optimization technique.

2. The system of claim 1, wherein the coupled autoencoder is further configured to receive an unknown corrupted sample, and wherein the source decoder $(W_{DS})$ is configured to:
receive the unknown corrupted sample from the coupled autoencoder;
obtain one or more hidden layer representations of the unknown corrupted sample and transmit to the coupling mechanism (M), wherein the coupling mechanism (M) further transmits the obtained one or more hidden layer representations of the unknown corrupted sample to the target encoder $(W_{ET})$.

3. The system of claim 2, wherein the coupled autoencoder is further configured to:
couple the obtained hidden layer representations with each other to obtain one or more hidden layer representations pertaining to the target autoencoder; and
transmit the hidden layer representations pertaining to the target autoencoder to the target encoder $(W_{ET})$ for generation of a clean sample from the unknown corrupted sample.

4. The system of claim 1, wherein the Lagrangian formulation is solved using a Split Bregman technique.

5. The system of claim 1, wherein the optimization technique is a gradient descent optimization technique, and wherein the step of learning each of the source decoder $(W_{DS})$, the target decoder $(W_{DT})$, the first proxy $(Z_S)$, the second proxy $(Z_T)$, the coupling mechanism (M), the plurality of Bregman relaxation variables $B_S$ and $B_T$, the source encoder $(W_{ES})$, the target encoder $(W_{ET})$ pertaining to the source autoencoder and the target autoencoder respectively comprising learning one or more values associated with each of the source decoder $(W_{DS})$, the target decoder $(W_{DT})$, the first proxy $(Z_S)$, the second proxy $(Z_T)$, the coupling mechanism (M), the plurality of Bregman relaxation variables $B_S$ and $B_T$, the source encoder $(W_{ES})$, the target encoder $(W_{ET})$ pertaining to the source autoencoder and the target autoencoder respectively.

6. A processor implemented method for solving inverse problems using a coupled autoencoder, the method comprising:
receiving (202), by a source autoencoder, one or more corrupted samples represented by a variable $X_S$, wherein a first set of hidden layer representations of the source autoencoder is represented as a first proxy $(Z_S)$ for the one or more corrupted image samples $(X_S)$, and wherein the source autoencoder including a source encoder represented by a variable $W_{ES}$ and a source decoder represented by a variable $W_{DS}$;
receiving (204), by a target autoencoder coupled to the source autoencoder, one or more corresponding clean image samples represented by a variable $X_T$, wherein a second set of hidden layer representations of the target autoencoder is represented as a second proxy represented by a variable $Z_T$ for the corresponding clean image samples represented by a variable $X_T$, wherein the target autoencoder comprises a target encoder represented by a variable $W_{ET}$ and a target decoder represented by a variable $W_{DT}$, wherein the $Z_S$ and $Z_T$ are coupled, using a coupling mechanism (M), which form a Lagrangian formulation, and wherein a plurality of Bregman relaxation variables ($B_S$) and ($B_T$) are initialized for the source autoencoder and the target autoencoder respectively;

dividing (206), by the coupled autoencoder, the Lagrangian formulation into one or more sub-problems;

solving (208), by the coupled autoencoder, the one or more sub-problems by learning each of the source decoder ($W_{DS}$), the target decoder ($W_{DT}$), the first proxy ($Z_S$), the second proxy ($Z_T$), the coupling mechanism (M), the plurality of Bregman relaxation variables $B_S$ and $B_T$, the source encoder ($W_{ES}$), the target encoder ($W_{ET}$) pertaining to the source autoencoder and the target autoencoder respectively; and iteratively updating (210), by the coupled autoencoder, the plurality of Bregman relaxation variables ($B_S$) and ($B_T$) using an optimization technique.

7. The method of claim 6, further comprising:

receiving, by a source decoder ($W_{DS}$), an unknown corrupted sample;

obtaining one or more hidden layer representations of the unknown corrupted sample and transmit to the coupling mechanism (M), wherein the coupling mechanism further transmits the obtained one or more hidden layer representations of the unknown corrupted sample to the target encoder ($W_{ET}$).

8. The method of claim 7, further comprising:

coupling the obtained hidden layer representations with each other to obtain one or more hidden layer representations pertaining to the target autoencoder; and transmitting the hidden layer representations pertaining to the target autoencoder to the target encoder ($W_{ET}$) for generation of a clean sample from the unknown corrupted sample.

9. The method of claim 6, wherein the Lagrangian formulation is solved using a Split Bregman technique.

10. The method of claim 6, wherein the optimization technique is a gradient descent optimization technique, and wherein the step of learning each of the source decoder ($W_{DS}$), the target decoder ($W_{DT}$), the first proxy ($Z_S$), the second proxy ($Z_T$), the coupling mechanism (M), the plurality of Bregman relaxation variables $B_S$ and $B_T$, the source encoder ($W_{ES}$), the target encoder ($W_{ET}$) pertaining to the source autoencoder and the target autoencoder respectively comprising learning one or more values associated with each of the source decoder ($W_{DS}$), the target decoder ($W_{DT}$), the first proxy ($Z_S$), the second proxy ($Z_T$), the coupling mechanism (M), the plurality of Bregman relaxation variables $B_S$ and $B_T$, the source encoder ($W_{ES}$), the target encoder ($W_{ET}$) pertaining to the source autoencoder and the target autoencoder respectively.

11. One or more non-transitory machine readable information storage mediums comprising one or more instructions which when executed by one or more hardware processors causes:

receiving, by a source autoencoder of a coupled autoencoder, one or more corrupted samples represented by a variable $X_S$, wherein a first set of hidden layer representations of the source autoencoder is represented as a first proxy ($Z_S$) for the one or more corrupted image samples ($X_S$), and wherein the source autoencoder including a source encoder represented by a variable $W_{ES}$ and a source decoder represented by a variable $W_{DS}$;

receiving, by a target autoencoder coupled to the source autoencoder, one or more corresponding clean image samples represented by a variable $X_T$, wherein a second set of hidden layer representations of the target autoencoder is represented as a second proxy represented by a variable $Z_T$ for the corresponding clean image samples represented by a variable $X_T$, wherein the target autoencoder comprises a target encoder represented by a variable $W_{ET}$ and a target decoder represented by a variable $W_{DT}$, wherein the $Z_S$ and $Z_T$ are coupled, using a coupling mechanism (M), which form a Lagrangian formulation, and wherein a plurality of Bregman relaxation variables ($B_S$) and ($B_T$) are initialized for the source autoencoder and the target autoencoder respectively;

dividing, by the coupled autoencoder, the Lagrangian formulation into one or more sub-problems;

solving, by the coupled autoencoder, the one or more sub-problems by learning each of the source decoder ($W_{DS}$), the target decoder ($W_{DT}$), the first proxy ($Z_S$), the second proxy ($Z_T$), the coupling mechanism (M), the plurality of Bregman relaxation variables $B_S$ and $B_T$, the source encoder ($W_{ES}$), the target encoder ($W_{ET}$) pertaining to the source autoencoder and the target autoencoder respectively; and iteratively updating, by the coupled autoencoder, the plurality of Bregman relaxation variables ($B_S$) and ($B_T$) using an optimization technique.

12. The one or more non-transitory machine readable information storage mediums of claim 11, wherein the instructions when executed by the one or more hardware processors further cause:

receiving, by a source decoder ($W_{DS}$), an unknown corrupted sample;

obtaining one or more hidden layer representations of the unknown corrupted sample and transmit to the coupling mechanism (M), wherein the coupling mechanism further transmits the obtained one or more hidden layer representations of the unknown corrupted sample to the target encoder ($W_{ET}$).

13. The one or more non-transitory machine readable information storage mediums of claim 11, wherein the instructions when executed by the one or more hardware processors further cause:

coupling the obtained hidden layer representations with each other to obtain one or more hidden layer representations pertaining to the target autoencoder; and transmitting the hidden layer representations pertaining to the target autoencoder to the target encoder ($W_{ET}$) for generation of a clean sample from the unknown corrupted sample.

14. The one or more non-transitory machine readable information storage mediums of claim 11, wherein the Lagrangian formulation is solved using a Split Bregman technique.

15. The one or more non-transitory machine readable information storage mediums of claim 11, wherein the optimization technique is a gradient descent optimization technique, and wherein the step of learning each of the source decoder ($W_{DS}$), the target decoder ($W_{DT}$), the first proxy ($Z_S$), the second proxy ($Z_T$), the coupling mechanism (M), the plurality of Bregman relaxation variables $B_S$ and $B_T$, the source encoder ($W_{ES}$), the target encoder ($W_{ET}$) pertaining to the source autoencoder and the target autoencoder respectively comprising learning one or more values associated with each of the source decoder ($W_{DS}$), the target decoder ($W_{DT}$), the first proxy ($Z_S$), the second proxy ($Z_T$), the coupling mechanism (M), the plurality of Bregman relaxation variables $B_S$ and $B_T$, the source encoder ($W_{ES}$), the target encoder ($W_{ET}$) pertaining to the source autoencoder and the target autoencoder respectively.

* * * * *